March 22, 1927.                                                                                1,621,770
C. J. ECKLAND
BUS VENTILATOR
Filed Aug. 12, 1925

Inventor
Charles J. Eckland
By S. H. S. Johnson
Attorney

Patented Mar. 22, 1927.

1,621,770

UNITED STATES PATENT OFFICE.

CHARLES J. ECKLAND, OF MINNEAPOLIS, MINNESOTA.

BUS VENTILATOR.

Application filed August 12, 1925. Serial No. 49,746.

The present invention relates to a ventilating system for motor busses.

In cold weather and during storms the windows of a motor bus are usually closed, and at such times it is desirable to provide adequate ventilation without the production of drafts, at the same time preventing the entrance of rain, snow, or dust through the ventilators.

An object of the present invention is to ventilate a motor vehicle by placing air intake means in a position which is shielded from the direct air stream passing the vehicle while in motion, and by positioning evacuating means in the air stream moving past the vehicle when the vehicle is in motion to cause a circulation of air through the interior of the vehicle.

In order to attain this object, there is provided, in accordance with one feature of the invention, an air intake vent positioned above the windshield of a motor bus beneath an overhanging roof portion, a curved baffle being positioned rearwardly of the opening to direct air entering therein upwardly toward the roof of the vehicle, and fibrous material retained in position on the baffle by means of a screen acting as a cover thereof. A plurality of evacuating vents are positioned beneath an overhanging, longitudinally extending roof portion to be shielded thereby, said evacuating vents being provided with tapered housings, said housings having the rear end thereof open. A closure plate is pivotally connected to the rear of the tapered vent housing to act as an extension of the outer wall thereof when said closure plate is in an open condition, and to form a closure across the rear end of the vent housing when the plate is in a closed condition.

These and other features of the invention, not specifically mentioned, will be more fully brought out in the following description and the accompanying drawings, wherein.

Figure 1:
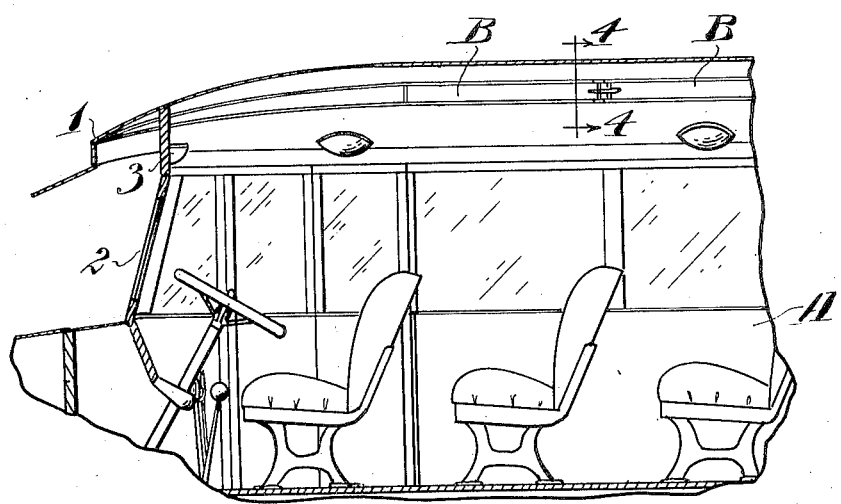
Figure 1, is a view in longitudinal section through a motor bus of a conventional type having a ventilating system comprising the present invention installed therein.
Figure 2:
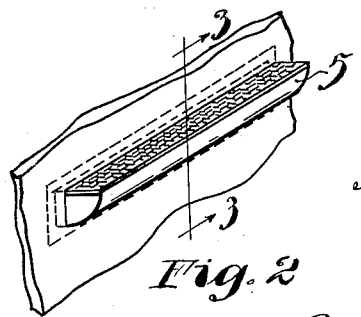
Figure 2, is a view in isometric perspective of an intake vent installed in the front wall of a motor vehicle.
Figure 3:
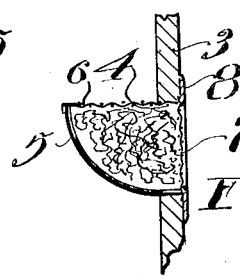
Figure 3, is a view in section on line 3—3 of Figure 2.

Referring to the drawings in detail, a bus A of a conventional type is provided with an overhanging roof portion 1 in the front thereof which extends forwardly over a windshield 2. Above the windshield is a vertical body member 3 which is customarily of wood or sheet metal, and in the member 3 an opening 4 (see Figure 3) is provided. On the interior side of the opening 4 a baffle member 5, which may be of sheet metal, is mounted. The baffle member 5 is preferably trough shaped and is covered on top by a woven wire mesh 6. On the outward side of the vertical member 3 the opening 4 is covered by a second piece of woven wire mesh 7, and the opening is surrounded by a frame 8 which also serves to hold the wire mesh 7 in position over the opening 4. The trough-shaped baffle member is filled with fibrous material, such as steel wool or curled hair, to remove dust and other particles carried by the air from the air stream and also to break up the air stream and set up cross currents therein to prevent drafts.

The roof of the bus is preferably constructed with a central portion 9 upset from the side portions 10 of the roof, the central portion overhanging the side portions 10 and being curved down to prevent access of rain or snow to a plurality of evacuating vents B which are positioned beneath the overhanging edges of the central roof section 9.

Figure 5:
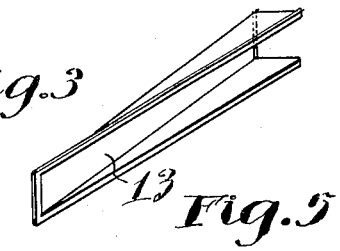
Figure 5, is a view in isometric perspective of a tapered baffle wall used on an evacuating vent.
Figure 4:
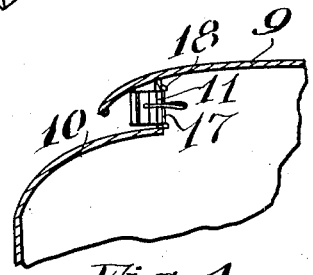
Figure 4, is a sectional view on line 4—4 of Figure 1.
Figure 6:
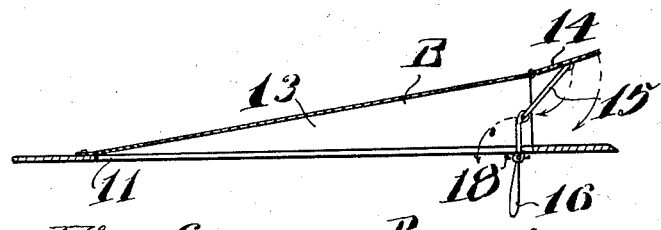
Figure 6, is a view in longitudinal section through an evacuating vent in open condition.
Figure 7:
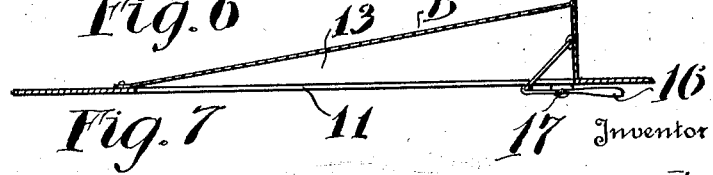
Figure 7, is a view of the mechanism shown in Figure 6 in closed condition.

In constructing the evacuating vents B an opening 11 is provided in the vertical wall which supports the center roof portion 9. A housing 13, shown in detail in Figure 5, is positioned over each of the openings 11 with the enlarged end of the housing facing to the rear. Pivotally connected to the outer edge of the rear end of the housing is a door 14 of a size to completely close the open rear end thereof. One end of a link 15 is pivotally connected to the door 14, the other end thereof being pivotally connected to an operating lever 16 which is mounted upon a rod 17, the rod being pivotally supported by a pair of brackets 18, one of which is positioned above, and the other below the opening 11. When the operating lever 16 is moved to a position at right angles with the edge of the vertical wall which supports the central roof portion 9, the door 14 is moved to the open position shown in Figure 6. When the lever 16 is rotated in a counter-clockwise direction to the position shown in Figure 6, the door is drawn to the closed position shown in Figure 7. When the bus is in motion a stream of air passes rearward over the vent housings 13, thereby causing, in accordance with a well known principle, a partial vacuum at the open rear end of the housing. This causes air to be drawn from the interior of the bus outwardly through the rear open end of the vent to fill the partial vacuum and thence the air from the interior of the bus is discharged into the rearwardly passing air stream. This action tends to reduce the pressure of the air interiorly of the bus. The windshield and the front of the bus, in moving through the air, build up the pressure in front of the opening 4 to slightly greater than atmospheric pressure. The combination of the reduced pressure of the air within the bus, and the slightly increased pressure of the air in front of the opening 4 tend to draw air into the opening 4, through the fibrous material contained interiorly of the baffle member 5 and thence into the interior of the bus. The air entering the forward vent is usually cooler than the air in the interior of the bus, and therefore, passes downward and mixes with the air already in the bus. The used air, having been in the bus longer than the fresh air which is drawn through the forward vent, rises to the upper portion of the bus and is drawn off through the evacuating vents B. The air passing through the fibrous material in the baffle means is broken up into a multitude of little air streams traveling in different directions. This prevents a stream of air from being drawn up against the roof of the bus and sweeping rearward until evacuated through the evacuating vents B. Should a strong wind be blowing laterally of the direction of the bus's travel so as to prevent the formation of a partial vacuum rearwardly of each of the vent housings 13, and to force air into the evacuating vents B on one side of the bus, the vents on that side may be closed, the evacuating vents on the other side providing sufficient suction to maintain a suitable circulation of air through the bus.

What I claim is:

An air evacuator for ventilating a bus, comprising a tapered housing having the enlarged end thereof open, said housing being mounted below an overhanging portion of the roof of said bus, closure means pivotally connected to the enlarged open end of said housing, said closure means having an open condition wherein said closure means extends outwardly and rearwardly of the evacuating vent to draw air from the interior of the bus, and a closed condition wherein the closure means is positioned across the evacuating vent and a handle lever pivotally mounted adjacent said housing and having link connection with said closure means to actuate said closure means upon an operation of said handle lever.

In testimony whereof I affix my signature.

CHARLES J. ECKLAND.